(12) United States Patent
McBeth et al.

(10) Patent No.: US 11,320,301 B2
(45) Date of Patent: May 3, 2022

(54) FRINGE-FREE LASER INTEFEROMETRIC SOUND DETECTION SYSTEM AND METHOD

(71) Applicant: The United States of America as represented by the Secretary of the Navy, San Diego, CA (US)

(72) Inventors: Michael Steven McBeth, Williamsburg, VA (US); Robert Alexander Younts, Raleigh, NC (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 484 days.

(21) Appl. No.: 16/566,254

(22) Filed: Sep. 10, 2019

(65) Prior Publication Data

US 2020/0018638 A1 Jan. 16, 2020

Related U.S. Application Data

(66) Substitute for application No. 15/596,817, filed on May 16, 2017, now abandoned.

(51) Int. Cl.
*G01H 9/00* (2006.01)

(52) U.S. Cl.
CPC .................... *G01H 9/00* (2013.01)

(58) Field of Classification Search
CPC .. G01H 9/00; G01H 5/00; G01H 3/00; G01N 21/17; G01N 21/41
USPC ........................................................ 367/149
See application file for complete search history.

(56) References Cited

U.S. PATENT DOCUMENTS

| | | | | | |
|---|---|---|---|---|---|
| 3,626,753 | A | * | 12/1971 | Aprahamian et al. | G01N 29/0663 356/32 |
| 3,831,135 | A | * | 8/1974 | Smith | G01H 9/002 348/163 |
| 4,422,167 | A | * | 12/1983 | Shajenko | H04R 23/008 367/149 |
| 4,655,608 | A | * | 4/1987 | Goss | G01K 11/24 374/117 |
| 4,998,225 | A | * | 3/1991 | Shajenko | G01H 9/00 250/227.19 |

(Continued)

OTHER PUBLICATIONS

F. Durst, A. Melling, and J. H. Whitelaw, Principles and Practice of Laser-Doppler Anemometry, Academic Press, New York, 1976.

(Continued)

*Primary Examiner* — Alexander A Mercado
(74) *Attorney, Agent, or Firm* — Naval Information Warfare Center, Pacific; Kyle Eppele; Susanna J. Torke (57) ABSTRACT

A system for detecting sound comprising a laser beam transmitter transmitting at least two parallel modulated laser beams through a medium having a measurable index of refraction, a beam termination mechanism configured to terminate the laser beams' transmission through the medium, a guide mechanism used to guide the terminated laser beam to at least one beam combiner, an envelope detector optically coupled to the beam combiner, wherein the envelope detector is configured to receive the terminated laser beam from the beam combiner, creating an angle modulated signal; a processor used to process the angle modulated signal to recover the sound.

19 Claims, 6 Drawing Sheets

(56) References Cited

U.S. PATENT DOCUMENTS

| | | | | |
|---|---|---|---|---|
| H1370 H | * | 11/1994 | Wolch | 356/130 |
| 5,379,270 A | * | 1/1995 | Connolly | G01H 5/00 |
| | | | | 367/128 |
| 5,504,719 A | * | 4/1996 | Jacobs | G01H 9/00 |
| | | | | 367/149 |
| 5,886,264 A | | 3/1999 | Hu | |
| 6,288,974 B1 | * | 9/2001 | Nelson | G01S 7/487 |
| | | | | 367/13 |
| 6,628,570 B2 | | 9/2003 | Ruffa | |
| 8,879,051 B2 | | 11/2014 | Dakin et al. | |
| 9,197,969 B2 | | 11/2015 | Iwamoto et al. | |
| 10,094,928 B2 | * | 10/2018 | Josset | G01S 7/499 |
| 2006/0126435 A1 | * | 6/2006 | Tam | G01H 9/004 |
| | | | | 367/149 |
| 2011/0037970 A1 | | 2/2011 | Rogers et al. | |
| 2013/0142519 A1 | | 6/2013 | Iwamoto et al. | |
| 2014/0050489 A1 | | 2/2014 | Iwamoto et al. | |
| 2014/0153930 A1 | | 6/2014 | Fischer | |
| 2018/0335339 A1 | | 11/2018 | McBeth et al. | |

OTHER PUBLICATIONS

Joseph F. Vignola, Yves H. Berthelot, and Jacek Jarzynski, "Laser detection of sound," J. Acoust. Soc. Am. 90 (3) Sep. 1991, pp. 1275-1286.

Susan H. Jack, David B. Hann, and Clive A. Greated, "Influence of the acousto-optic effect, on laser Doppler anemometry signals," Review of Scientific Instruments, vol. 69, No. 12, Dec. 1998, pp. 4074-4081.

R.I. Crickmore, S.H. Jack, D.B. Hann, and C.A. Greated, "Laser Doppler Anemometry and the Acousto-Optic Effect," Optics and Laser Technology, vol. 31, pp. 85-94, 1999.

P.C.M. Galloway, Y. Hardalupas, and I. Prassas, "Ultrasound Measurement by Laser Doppler Anemometry," 10th International Symposium on Application of Laser Techniques to Fluid Mechanics, Lisbon, Portugal, Jul. 10-13, 2000.

McBeth, Michael S. and Yongxiang Hu, "On Continuous-Line Acoustic Array Behavior in a Laser Doppler Sound Pressure Measurement System," Invited Paper, 157th meeting of the Acoustical Society of America, Portland, OR, May 18-22, 2009.

McBeth, Michael S., "Prospects for a Laser Doppler System for Remote Sensing of Underwater Sound: Hearing Underwater From Space (HUFS)," Friday Tech Brief, Space and Naval Warfare System Center Atlantic, Charleston, SC, Jul. 24, 2009.

Kenji Ishikawa, Kohei Yatabe, Nachanant Chitanmont, Yusuke Ikeda, Yasuhiro Oikawa, Takashi Onuma, Hayato Niwa, and Minoru Yoshii, "High-speed imaging of sound using parallel phase-shifting interferometry," Optics Express, vol. 24, No. 12, Jun. 13, 2016.

* cited by examiner

FRINGE-FREE LASER INTEFEROMETRIC SOUND DETECTION SYSTEM AND METHOD

FEDERALLY-SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, Atlantic, Code 70F00, North Charleston, S.C., 29419-9022; voice (843) 218-3495; email ssc_lant_T2@navy.mil; reference Navy Case Number 111501.

BACKGROUND

Detecting acoustic sound waves has historically been accomplished by either using physical hydrophones coupled with sound waves from water to produce a representation of the sound, or by using laser beams (Laser Doppler velocimetry) to interact with the water to detect sound. Both methods have limitations, such as limited frequency response, the need for physical cables to relay electrical signals, and limited detection sensitivity. One additional method is Laser Doppler anemometry (LDA), using two coherent laser beams that intersect in the water to form a set of interference fringes. The main disadvantages with this method are its low sensitivity and restriction to high acoustic frequencies. The method is intended to make point measurements of the sound field where the fringe volume is minimized by using relatively large beam separation angles and the laser light path through the water is minimized to reduce the integrating effect of the acousto-optic effect of sound components over the laser light path through the water. The disadvantages of LDA include requiring very intense sound waves to produce detectable signals and the need to capture light from a relatively small fringe volume.

The system described herein uses a Laser Doppler anemometry (LDA) system having a small beam separation angle and long laser light paths through the water, which has shown to be capable of detecting low intensity sound pressure signals. With this system, each pair of laser beams is spatially separated and does not need to intersect in the liquid. No interference fringes are required to be formed in the fluid. The sound transduction is entirely due to the acousto-optic effect that integrates the sound signal via the optical path difference between the beams. Each laser beam pair only comes together as it is co-aligned in a beam combiner and fed into optical detector(s). This has the effect of always providing a large frequency modulated carrier difference signal that is required to obtain the most usable angle modulation sidebands from the effect of the sound waves in the liquid.

DETAILED DESCRIPTION OF SOME EMBODIMENTS

Reference in the specification to "one embodiment" or to "an embodiment" means that a particular element, feature, structure, or characteristic described in connection with the embodiments is included in at least one embodiment. The appearances of the phrases "in one embodiment", "in some embodiments", and "in other embodiments" in various places in the specification are not necessarily all referring to the same embodiment or the same set of embodiments.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

Figure 1A:
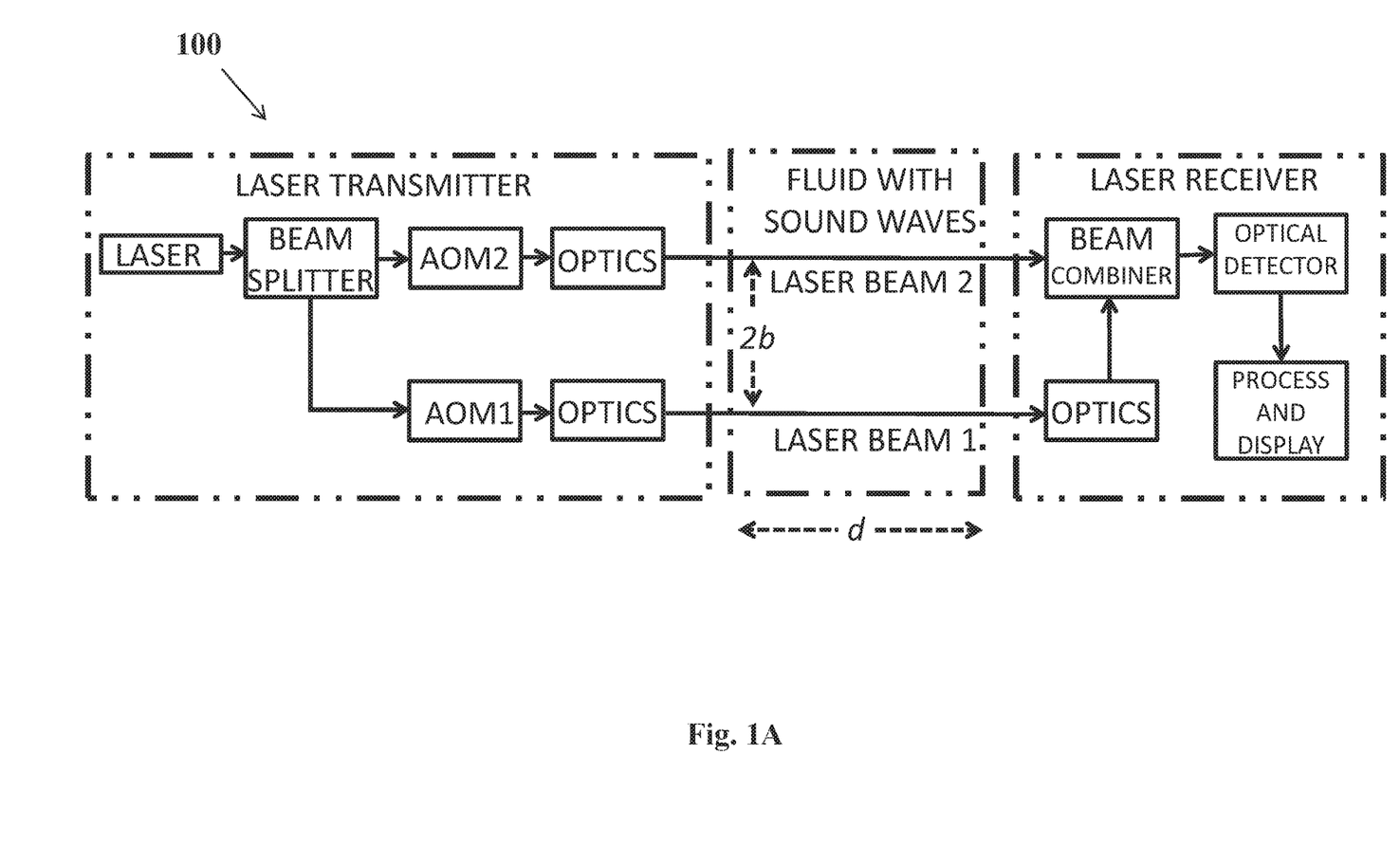
FIGS. 1A-1C show various embodiments of a system 100 in accordance with the Fringe-Free Laser Interferometric Sound Detection System and Method.
Figure 1B:
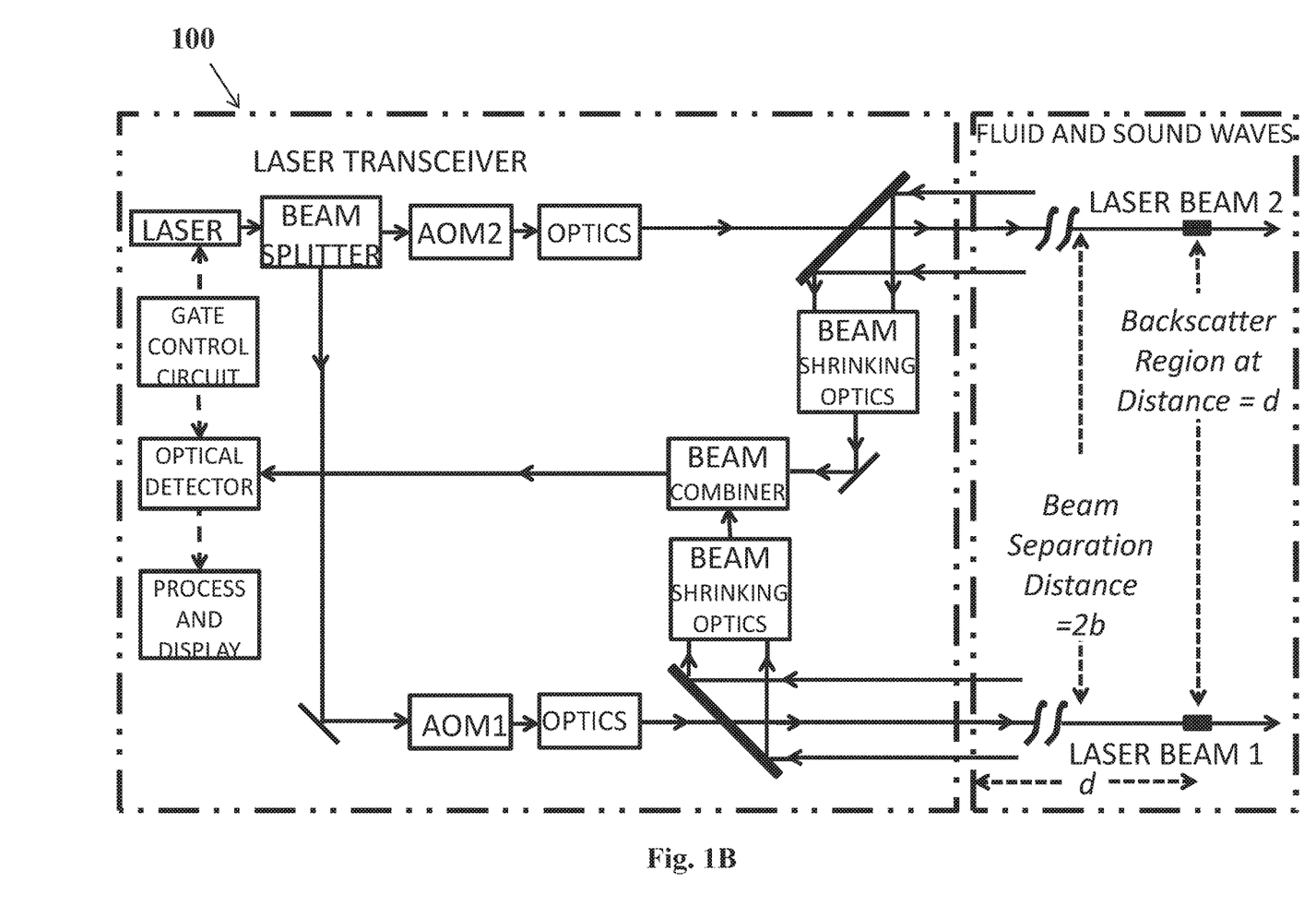
Figure 1C:
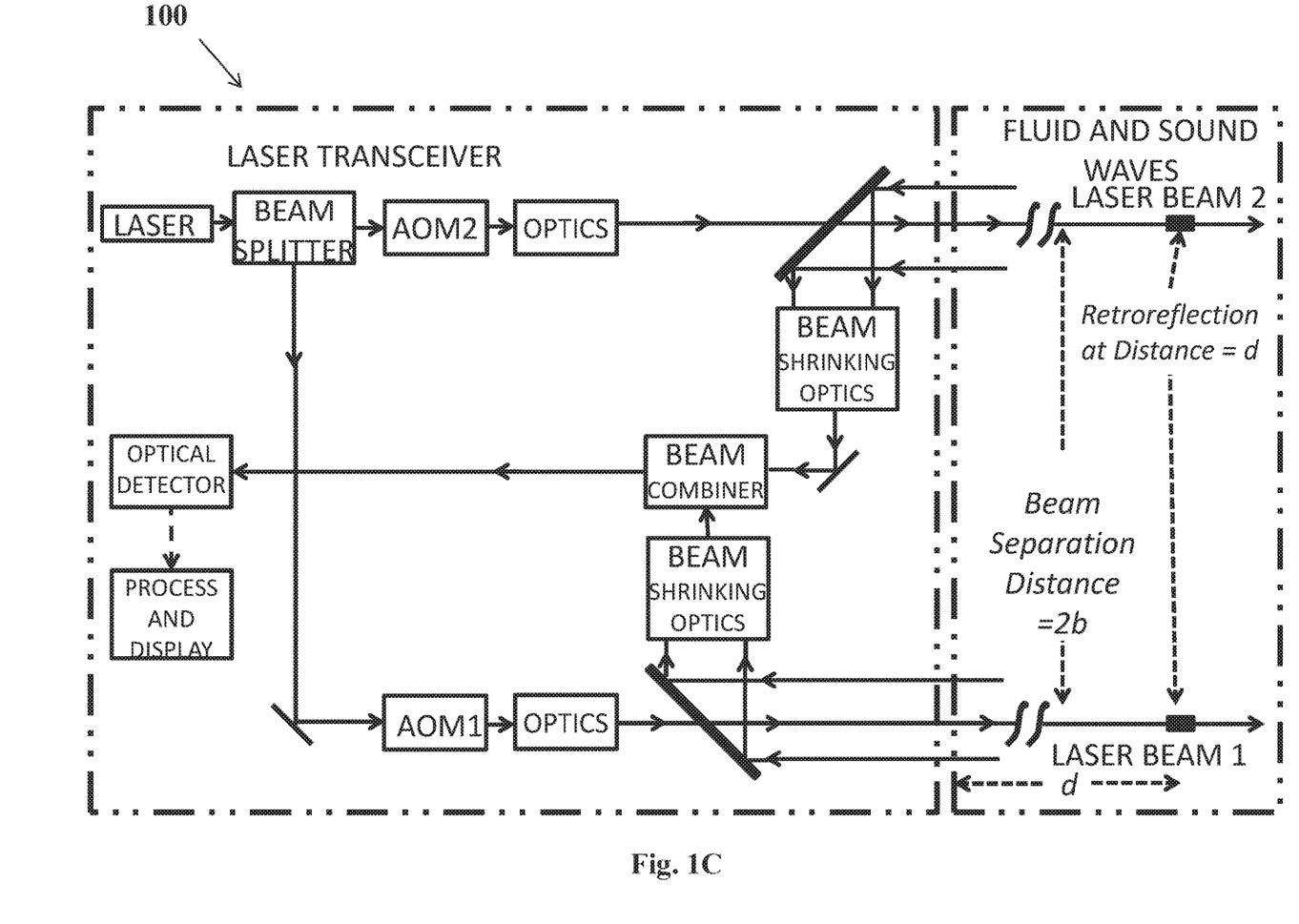

FIGS. 1A-1C show various embodiments of a system 100 in accordance with the Fringe-Free Laser Interferometric Sound Detection System and Method. FIG. 1A utilizes a direct transmission (physical boundary) beam termination mechanism. FIG. 1B utilizes a backscatter beam termination mechanism. FIG. 1C utilizes a retroreflector beam termination mechanism.

Figure 2:
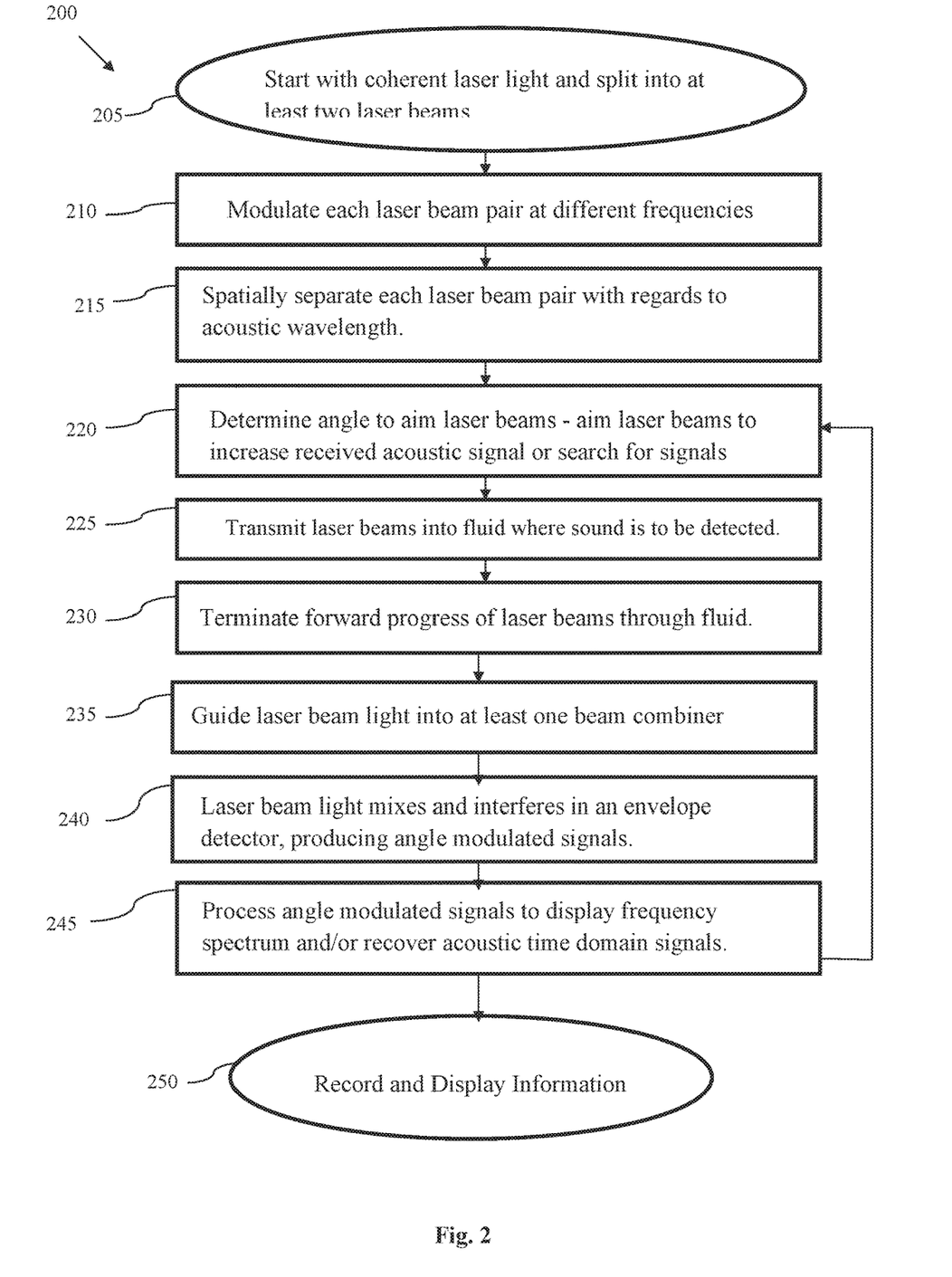
FIG. 2 shows a flow chart of a method to detect sound under water in accordance with the Fringe-Free Laser Interferometric Sound Detection System and Method.
Figure 3:
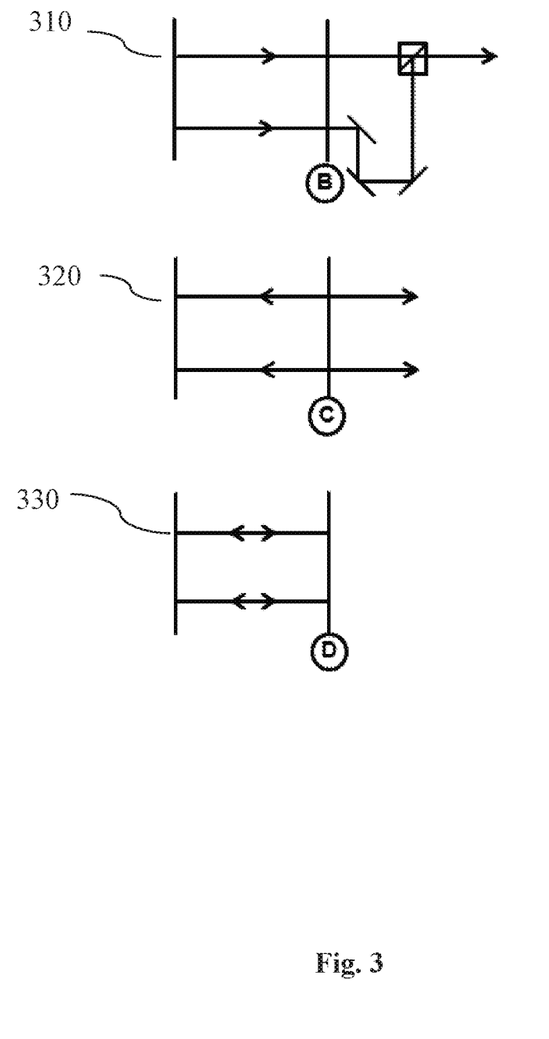
FIG. 3 shows how Forward Progress Termination is realized with three different beam termination mechanisms in accordance with the Fringe-Free Laser Interferometric Sound Detection System and Method.

FIG. 2 shows a flow chart of a method 200 used to detect sound under water. In the first step 205, a laser using coherent laser light is split into at least two laser beams. At least two laser beams are required for the method, and additional beams can be optimized for different acoustic frequencies (based on laser beam separation distances) and/or aimed in different directions to provide increased directional coverage. The laser beam can be pulsed or continuous. For a backscatter method as described in FIG. 3B, the laser needs to be pulsed. For the transmission and retroreflector cases as described in FIGS. 3A and 3C, respectively, the laser can be pulsed or continuous.

For step 210, the laser beams are modulated using the Acousto-Optic Modulator (AOM). Each pair of laser beams used to detect sound in the fluid have different modulation frequencies. The difference in modulation frequencies should be optimized with respect to the angle modulated (here angle refers to changes in the Frequency and/or Phase) so that the difference in modulation frequencies which equals the carrier signal frequency provides good performance. The angle modulated sidebands containing the acoustic signal information are formed in the detected signal and if the carrier frequency is too large, for example, 1 MHz for a 100 Hz acoustic signal, then the modulation index will be small and performance will suffer. If the carrier frequency is too small, for example 1 kHz for a 2 kHz acoustic signal, this would cause performance problems as well.

For step 215, the laser beams are separated with respect to the acoustic wavelengths to be detected. For example, the highest sensitivity for detecting 100 Hz sound waves in water occurs at a laser beam spacing of one half acoustic wavelength. Since the wavelength for 100 Hz sound in water is about 15 meters, half this distance is 7.5 meters. While this beam separation provides increased sensitivity to 100 Hz sound waves because one laser beam is predominately in a pressure peak while the other laser beam is in a pressure trough which provides a maximum optical path length difference, it provides poor sensitivity for 200 Hz sound waves since 7.5 meters is approximately one wavelength at 200 Hz. At 200 Hz and with a 7.5 meter laser beam spacing, both laser beams travel predominately in pressure peaks or troughs at the same time resulting in a minimum of optical path difference between the beams. Thus, to achieve signal detection at 100 Hz and 200 Hz at the same time, the laser beam spacing would be set at 1.5 meters which is one half wavelength at 500 Hz, then sound could be detected at both 100 Hz and 200 Hz at the same time.

For step 220, the angle(s) to aim the laser beams is determined. Beam aiming may be done to maximize received signal strength which also provides an indication of the direction of the received sound wave since the signal will increase at the angle between the laser beams and a plane acoustic wave gets closer and closer to 90 degrees. Laser beams are aimed prior to transmitting them into the fluid. Each pair of laser beams can be aimed to diverge, converge, or be parallel. Parallel beams can have a greater impact on sensitivity because in the optical path difference equation (provided as equation (1) below) the laser beam spacing only optimizes the numerator where the sine term can only grow to a value of 1 while the closer the angle between the laser beam axis and the sound wave comes to 90 degrees, the larger the optical path difference up to the limit of 2Δnd sin(kb) sin(ωt) at θ=90 degrees.

$$opd = \frac{2\Delta n \sin(kb\sin\theta)}{k\cos\theta} \times [\cos(\omega t) - \cos(kd\cos\theta + \omega t)] \quad (1)$$

For step 225, the laser beams are transmitted into the fluid where the sound is to be detected. The laser beams need to travel through the fluid where the sound waves cause changes to the index of refraction leading to the optical path differences and the detectable signal. Each pair of laser beams may be parallel, diverging, or converging, with the nominal case being parallel.

For step 230, the forward progress of the laser beams through the fluid is terminated. While "forward progress termination" is common to all of the embodiments, there are multiple beam termination mechanisms and they are described in FIG. 3.

For step 235, the terminated laser beams light is guided to one or more beam combiners. With direct transmission, optical components such as mirrors are used to guide and route the laser beam light paths to the beam combiners. In the backscatter and retroreflector cases, telescopes or large mirrors are used to capture the back propagating laser light, after which optical components that may be mirrors are used to guide and route the laser beam light to the one or more beam combiners.

For step 240, the received laser beam light enters the envelope detector(s) where it mixes and interferes in the envelope detector. The envelope detector produces an angle modulated signal(s) where the carrier signal is equal to the difference in laser beam light modulation frequencies and the angle modulated sidebands are proportional to the acoustic sound signal. The sideband to carrier ratio is proportional to the acoustic sound signal intensity and the sideband frequency spacing is proportional to the acoustic sound signal frequencies.

For step 245, the angle modulated signal(s) are processed to display the frequency spectrum and/or recover the acoustic time domain signal(s). The frequency spectrum may be produced by using the Fast Fourier Transform (FFT) or similar algorithm. The acoustic time domain signal may be recovered by using a Hilbert transform or similar algorithm.

For step 250, the processed signal information is recorded and displayed for use by a human operator and/or additional computer processing and analysis.

FIG. 3 shows how forward progress termination is realized with several beam termination mechanisms: direct transmission 310, backscatter 320, and retroreflector 330. With direct transmission 310, the forward progress of the laser beams through the fluid is terminated by a physical boundary B, such as the side of a receiving platform or the glass side of a salt water tank.

For backscatter 320, the forward progress of the laser light that will be used to detect the sound signal is terminated by "backscatter" events where a small fraction of the laser light is scattered back toward the laser transmitter. In backscatter 320, forward progress of laser beam light to be used for detecting sound through fluid is terminated by backscatter at C.

For retroreflector 330, the forward progress of the laser light is terminated by one or more retroreflectors that reflect the incident light directly back toward the transmitter. For retroreflector 320, forward progress of laser beams through fluid is terminated by the retroreflector at D. In backscatter 320 and retroreflector 330, telescopes or large mirrors are used to capture the back propagating laser light, after which optical components that may be mirrors are used to guide and route the laser beam light to the one or more beam combiners.

Figure 4:
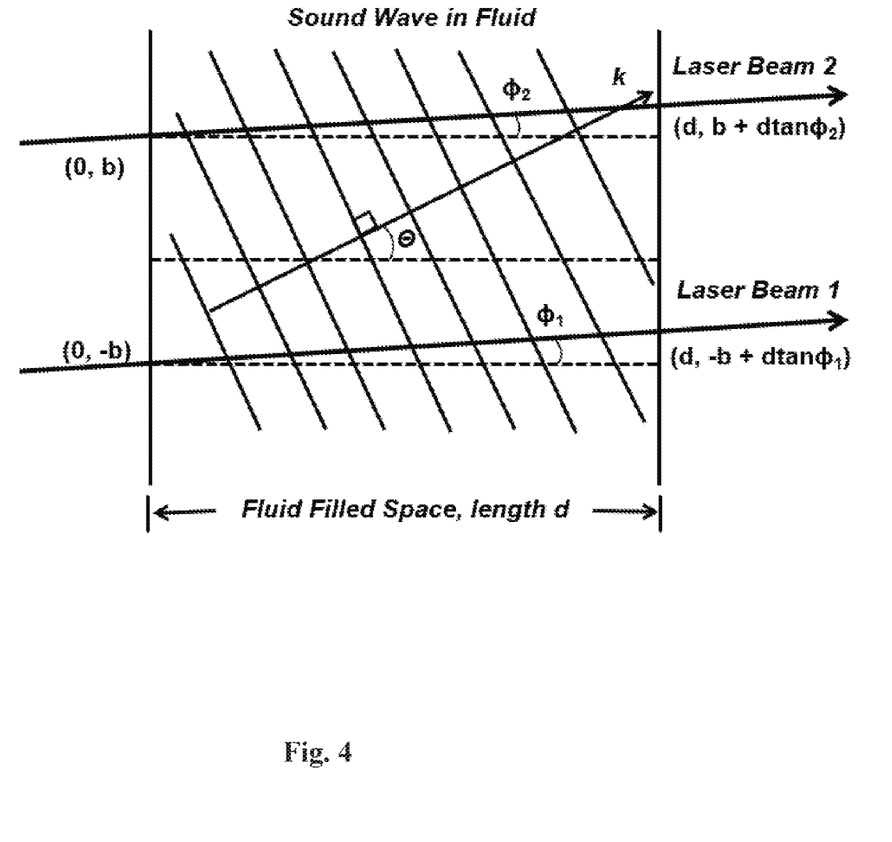
FIG. 4 shows geometry for spatially separated laser beams interacting with a sound wave in a fluid filled space in accordance with the Fringe-Free Laser Interferometric Sound Detection System and Method.

FIG. 4 shows the geometry for two laser beams transmitting a fluid-filled space with an acoustic sound field present. The direction of the plane sound wave makes an angle, Θ, with the x-axis. The direction of laser beam 1 makes an angle, ϕ1, with the x-axis and the direction of laser beam 2 makes an angle, ϕ2, with the x-axis. The optical path length for one of the laser beams may be calculated by the line integral of the index of refraction, n, over the path.

Two modulated and spatially separated laser beams transit a fluid region where sound waves are to be detected. The detection of sound waves depends on the difference in optical path length between the two laser beams.

The sound pressure causes a small change in the index of refraction of the fluid. The index of refraction is the ratio of the speed of light in vacuum to the speed of light in the fluid. In the case of water, the index of refraction is about 1.33. The change in the index of refraction caused by sound pressure in water is small ranging from 1 part in $10^{-13}$ to 1 part in $10^{-8}$ depending on the intensity of the sound.

$$opl = \oint n\, dl \tag{2}$$

The difference in optical path length between the two laser beams is:

$$opd = opl1 - opl2 \tag{3}$$

With a sound wave present the two dimensional index of refraction is:

$$n(x,y) = n_0 + \Delta n \cos(k_x x + k_y y + \omega t) \tag{4}$$

Where $n_0$ is the index of refraction of the fluid without sound waves, $\Delta n$ is the change in the index of refraction due to the peak pressure of the sound wave, kx is the wave number of the sound wave in the x-direction, ky is the wave number of the sound wave in the y-direction, and $\omega$ is the angular frequency of the sound wave.

The optical path difference may be found by substituting equation (4) into equation (2) for each of the laser beams to find the optical path length for each laser beam which is, in turn, substituted into equation (3). The geometry in FIG. 4 includes at least three specialized simplifications including uniformly diverging laser beams ($-\phi 1 = \phi 2$), uniformly converging laser beams ($\phi 1 = \phi 2$), and parallel laser beams ($\phi 1 = \phi 2$). Here we only consider the parallel beam case. The optical path length may be simplified assuming the laser beams are parallel so that $\phi 1 = \phi 2 = \phi$ to produce:

$$opd = \frac{-2\Delta n \sin(kb\sin\theta)}{k\cos\theta + k\sin\theta\tan\phi} \times [\cos(\omega t) - \cos(kd\cos\theta + kd\sin\theta\tan\phi + \omega t)] \tag{5}$$

When the laser beams are parallel to the x-axis, $\phi = 0$ and equation (5) reduces to:

$$opd = \frac{-2\Delta n \sin(kb\sin\theta)}{k\cos\theta} \times [\cos(\omega t) - \cos(kd\cos\theta + \omega t)] \tag{6}$$

At an envelope detector which may be a photodiode detector, the light intensity for two collinearly, linearly polarized modulated laser beams overlapped on a detector when the modulation frequencies are larger than the detector bandwidth may be shown to be:

$$I = \frac{E_1^2 + E_2^2}{2} + E_1 E_2 \cos(\Delta\omega t + \delta) \tag{7}$$

Where I is the intensity, $E_1$ is the electric field of laser beam 1, $E_2$ is the electric field of laser beam 2, $\Delta\omega$ is the difference in the laser beam modulation frequencies, and $\delta$ is a time-dependent phase which can be written in terms of opd as:

$$\delta(t) = \frac{2\pi(opd)}{n_0 \lambda_0} \tag{8}$$

Where $n_0$ is the index of refraction in the fluid and $\lambda_0$ is the wavelength of the laser light.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A system for detecting sound comprising:
    a laser beam transmitter transmitting at least two parallel modulated laser beams through a medium having a measurable index of refraction;
    a beam termination mechanism configured to terminate the laser beams' transmission through the medium;
    a guide mechanism used to guide the terminated laser beam to at least one beam combiner;
    an envelope detector optically coupled to the beam combiner, wherein the envelope detector is configured to receive the terminated laser beam from the beam combiner, creating an angle modulated signal;
    a processor used to process the angle modulated signal to recover the sound.

2. The system of claim 1 wherein the laser beams are Continuous Wave laser beams.

3. The system of claim 1 wherein the laser beams are pulsed laser beams.

4. The system of claim 3 wherein the medium is water.

5. The system of claim 1 wherein the beam termination mechanism is a physical boundary.

6. The system of claim 5 wherein the guide mechanism is a mirror.

7. The system of claim 1 wherein the beam termination mechanism is a series of backscatter events created where a fraction of the laser beam is scattered back toward the laser beam transmitter.

8. The system of claim 7 wherein the guide mechanism is a mirror.

9. The system of claim 1 wherein the beam termination mechanism is at least one retroreflector that reflects the incident laser beam directly back toward the laser beam transmitter.

10. The system of claim 9 wherein the guide mechanism is a mirror.

11. A method comprising the steps of:
    splitting a coherent laser light into at least two parallel laser beams;
    modulating the laser beams at different frequencies;
    maintaining a desired distance between the two laser beams based on an acoustic wavelength;
    transmitting laser beams where sound is to be detected;
    terminating forward progress of laser beams;
    guiding laser beam into a beam combiner, where it interferes inside an envelope detector;
    producing angle modulated signals;
    processing signals to display a frequency spectrum; and
    recovering acoustic time domain signals.

12. The method of claim 11 wherein laser beams are transmitted under water.

13. The method of claim 12 wherein an acousto-optical modulator is used to modulate the laser beams.

14. A system comprising at least two parallel modulated laser beams dispersed within a medium having a measurable index of refraction;
    a beam termination mechanism that terminates the laser beams' forward progress within the medium;
    a receiver that receives the laser beam from a specified distance within the medium, creating a sound pressure signal;
    the sound pressure causing a change in the index of refraction of the medium causing an optical path length difference between the at least two parallel modulated laser beams;
    the difference in optical path length allowing for detection of sound.

15. The system of claim 14 wherein the laser beams are Continuous Wave laser beams.

16. The system of claim 14 wherein the laser beams are pulsed laser beams.

17. The system of claim 14 wherein the medium is water.

18. The system of claim 17 wherein the receiver is an envelope detector.

19. The system of claim 18 wherein the sound pressure signal appears as Frequency Modulated sidebands.

\* \* \* \* \*